United States Patent
Chiang

(10) Patent No.: US 8,577,297 B2
(45) Date of Patent: Nov. 5, 2013

(54) SIGNAL TRANSCEIVING CIRCUIT AND NOISE REDUCTION CIRCUIT

(75) Inventor: Ming-Cheng Chiang, Hsin-Chu (TW)

(73) Assignee: Realtek Semiconductor Corp., Science Park, HsinChu (TW)

( * ) Notice: Subject to any disclaimer, the term of this patent is extended or adjusted under 35 U.S.C. 154(b) by 568 days.

(21) Appl. No.: 12/895,876

(22) Filed: Oct. 1, 2010

(65) Prior Publication Data

US 2011/0081874 A1    Apr. 7, 2011

Related U.S. Application Data

(60) Provisional application No. 61/248,434, filed on Oct. 3, 2009.

(51) Int. Cl.
*H04B 1/00* (2006.01)
*H04B 15/00* (2006.01)

(52) U.S. Cl.
USPC ............................ 455/63.1; 455/296

(58) Field of Classification Search
USPC ............... 375/221, 346; 455/63.1, 67.11, 296
See application file for complete search history.

(56) References Cited

U.S. PATENT DOCUMENTS

| | | | | |
|---|---|---|---|---|
| 3,772,514 A | * | 11/1973 | Sunderland | 250/551 |
| 3,993,947 A | * | 11/1976 | Maltby et al. | 324/610 |
| 4,031,504 A | * | 6/1977 | Mioduski | 367/67 |
| 4,146,834 A | * | 3/1979 | Maltby et al. | 324/610 |
| 4,477,896 A | * | 10/1984 | Aker | 370/201 |
| 6,078,299 A | * | 6/2000 | Scharfe, Jr. | 343/858 |
| 6,298,046 B1 | * | 10/2001 | Thiele | 370/282 |
| 6,751,202 B1 | * | 6/2004 | Henrie | 370/286 |
| 6,792,250 B1 | * | 9/2004 | Zarubin | 455/115.1 |
| 7,386,119 B1 | * | 6/2008 | Henrie | 379/402 |
| 2002/0085510 A1 | * | 7/2002 | Chan | 370/286 |
| 2003/0031139 A1 | | 2/2003 | Thilenius | |
| 2003/0095474 A1 | * | 5/2003 | McCord | 367/903 |
| 2009/0175157 A1 | * | 7/2009 | Huang et al. | 370/201 |
| 2010/0266000 A1 | * | 10/2010 | Froimovich et al. | 375/222 |
| 2013/0010855 A1 | * | 1/2013 | Zerbe et al. | 375/232 |

FOREIGN PATENT DOCUMENTS

TW    200828838    7/2008

\* cited by examiner

*Primary Examiner* — Lewis West
(74) *Attorney, Agent, or Firm* — Winston Hsu; Scott Margo

(57) ABSTRACT

A signal transceiving circuit, comprising: a receiver, for receiving a input signal; a transmitter, for transmitting an output signal; and a resistance circuit, for omitting the noise caused by the output signal to the input signal. The resistance circuit comprises: a voltage transferring circuit, for generating a voltage transferred signal, and a voltage dividing circuit, for voltage dividing the voltage transferred signal and the output signal, such that the voltage generated at the receiver is cancelled by the voltage generated by the voltage transferred signal at the transceiver. A noise reduction circuit that can be utilized in this signal transceiving circuit is also disclosed.

18 Claims, 3 Drawing Sheets

US 8,577,297 B2

SIGNAL TRANSCEIVING CIRCUIT AND NOISE REDUCTION CIRCUIT

CROSS REFERENCE TO RELATED APPLICATIONS

This application claims the provisional application, which is U.S. Provisional Application No. 61/248,434, filed Oct. 3, 2009, and is included herein by reference.

BACKGROUND OF THE INVENTION

1. Field of the Invention

The present invention relates to a signal transceiving circuit, and particularly relates to a signal transceiving circuit that can omit the noise caused by nearby transmitters. The present invention also relates to a noise reduction circuit that can be utilized to the signal transceiving circuit.

2. Description of the Prior Art

FIG. 1 is a prior art signal transceiving circuit. As shown in FIG. 1, the transmitter 101 outputs an output signal OS to a receiver 105 of another transceiving circuit via a cable 103, and the receiver 107 receives an input signal IS via the cable 103. However, in a current transceiving circuit, a group consisted of a transmitter 101 and a receiver 107 always shares the same transmitting lines, as shown in FIG. 1. In this situation, the transmitter 101 can be regarded as a nearby transmitter for the receiver 107. Such structure will cause the output signal OS to generate noise to the input signal IS, and the quality for the receiver 107 to receive the input signal IS is also affected.

Some inventions are developed to solve this problem. For example, the U.S. patent with U.S. Pat. No. 6,744,831 has disclosed such technology. As shown in FIG. 3 thereof, this patent utilizes a device 88 to counteract the noise caused by the output signal to the input signal. However, such kind of prior art needs extra circuits and accurate control to omit noise. By this way, a larger circuit area is needed, and design complexity, production cost also increase.

SUMMARY OF THE INVENTION

Therefore, one objective of the present invention is to provide a signal transceiving circuit, which can utilize a simple circuit to counteract with the noise caused by the nearby transmitter. Besides, the present invention also discloses the noise reduction circuit that is utilized in the transceiving circuit.

One embodiment of the present invention discloses a signal transceiving circuit, which comprises: a receiver, for receiving an input signal; a transmitter, for transmitting an output signal; and a resistance circuit for omitting noise that the output signal caused to the input signal. The resistance circuit comprises: a voltage transferring circuit, for generating a voltage transferring signal according to the output signal; and a voltage dividing circuit, for voltage-dividing the voltage transferring signal and the output signal, such that a voltage that the output signal generates at the receiver will be counteracted with a voltage that the voltage transferred signal generates at the receiver.

Another embodiment discloses a noise reduction circuit, which outputs an output signal from a signal outputting source and receives an input signal from a receiver. The noise reduction circuit comprises: a voltage transferring circuit, for generating a voltage transferring signal according to the output signal; and a voltage dividing circuit, for voltage dividing the voltage transferring signal and the output signal, such that a voltage that the output signal generates at the receiver will be counteracted with a voltage that the voltage transferred signal generates at the receiver.

Another embodiment discloses a signal transceiving circuit, which is coupled to a signal input source comprising a first input terminal and a second input terminal. The signal transceiving circuit comprises: a receiver, for receiving an input signal; a transmitter, comprising a first transmitting terminal and a second transmitting terminal, and for transmitting a differential output signal via the first transmitting terminal and the second transmitting terminal; and a resistance circuit, for omitting noise that the output signal caused to the input signal, comprising. The resistance circuit comprises a first resistance device, having one terminal coupled to the second transmitting terminal, and the other terminal coupled to the first input terminal; a second resistance device, having one terminal coupled to the first transmitting terminal, and the other terminal coupled to the second input terminal; a first voltage dividing circuit, coupled between the first transmitting terminal and the first receiving terminal; and a second voltage dividing circuit, coupled between the second transmitting terminal and the second receiving terminal.

Via above-mentioned embodiments, only a resistance circuit is needed to counteract the noise that a nearby transmitter causes to the receiver, thus no complex circuit and tough circuit control. By this way, circuit area can decrease, and the cost for manufacturing and design can decrease.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
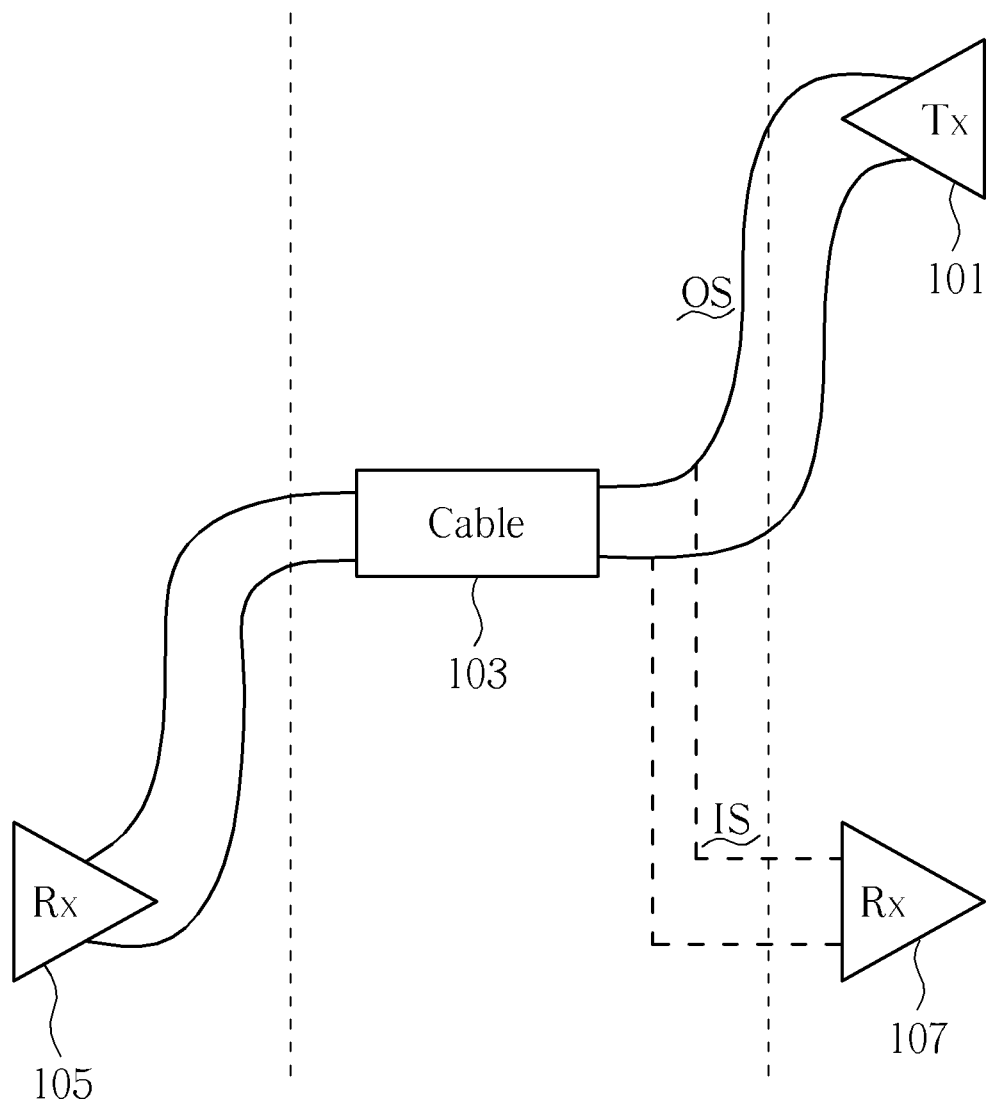
FIG. 1 is a prior art signal transceiving circuit.
Figure 2:
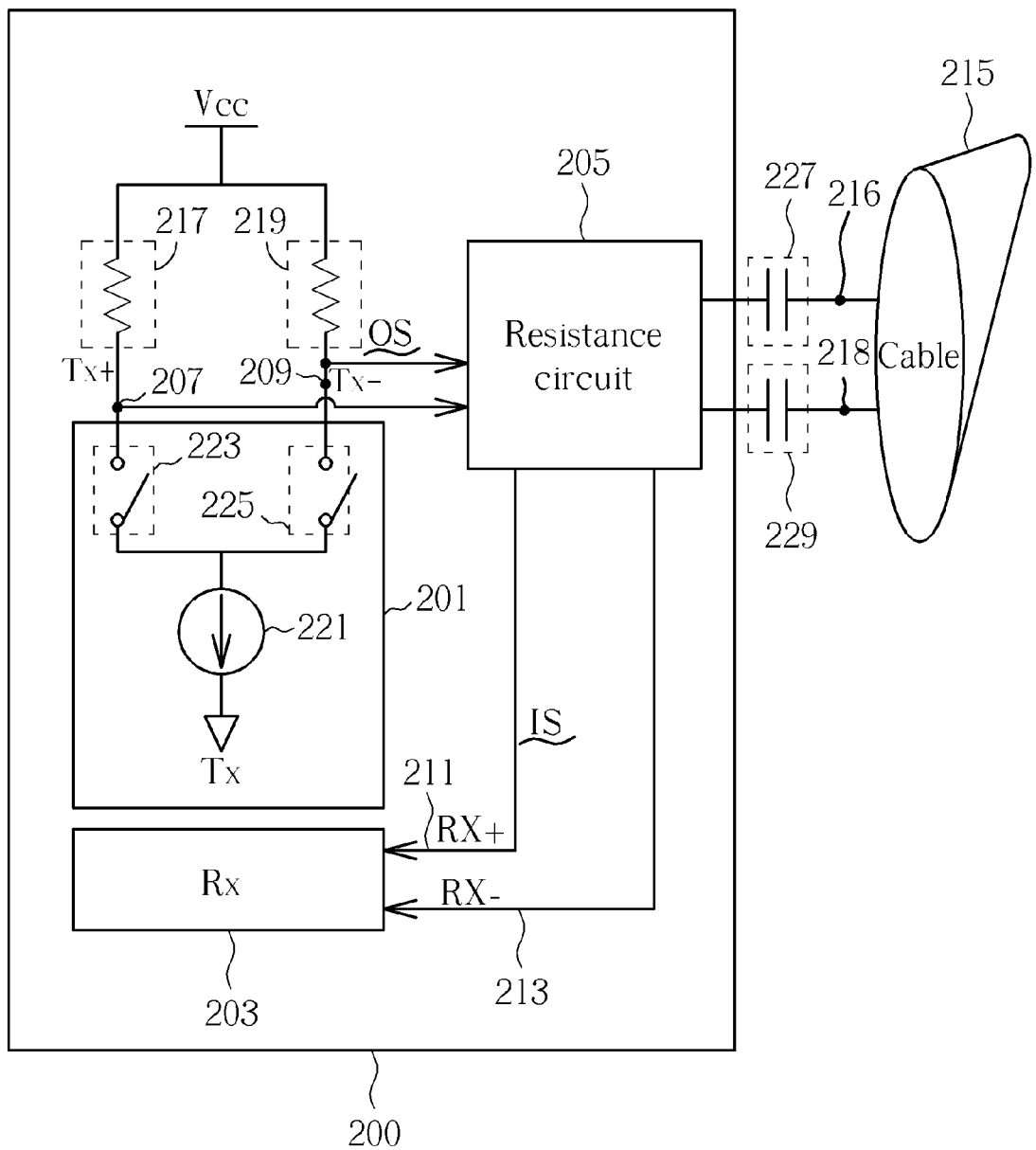
FIG. 2 is a circuit diagram illustrating a signal transceiving circuit 200 according to one embodiment of the present invention.

FIG. 2 is a circuit diagram illustrating a signal transceiving circuit 200 according to one embodiment of the present invention. As shown in FIG. 2, the signal transceiving circuit 200 comprises a transmitter 201, a receiver 203 and a resistance circuit 205. The receiver 201 receives an input signal IS. The transmitter 201 transmits an output signal OS. The resistance circuit 205 is coupled to a first input terminal 216 and a second input terminal 218 of a cable 215. The resistance circuit 205 can be consisted of resistors, or other active/ passive devices having resistance characteristics, to omit the noise that the output signal OS causes to the input signal IS. In this embodiment, the signal transceiving circuit 200 utilizes a differential signal, thus the transmitter 201 includes a first transmitting terminal 207 and a second transmitting terminal 209, and the receiver 203 includes a first receiving terminal 211 and a second receiving terminal 213. However, it does not indicate that the concept of the present invention is limited to be utilized to a signal transceiving circuit utilizing a differential signal.

Additionally, in the embodiment shown in FIG. 2, the cable is a HDMI (High Definition Multimedia Interface) cable. Resistors 217, 219, which are 10 ohm in this embodiment, are provided between the transmitter 201 and the voltage source Vcc. Also, capacitors 227 and 229 are provided between the cable 215 and the resistance circuit 205. Additionally, the transmitter 201 includes two switches 223, 225 and a current source 221. It should be noted that, these detail structures are only for example and do not mean to limit the scope of the present invention. For example, the transmitter 201 can be different kinds of transmitters, and the cable 215 can be other kinds of cables.

Figure 3:
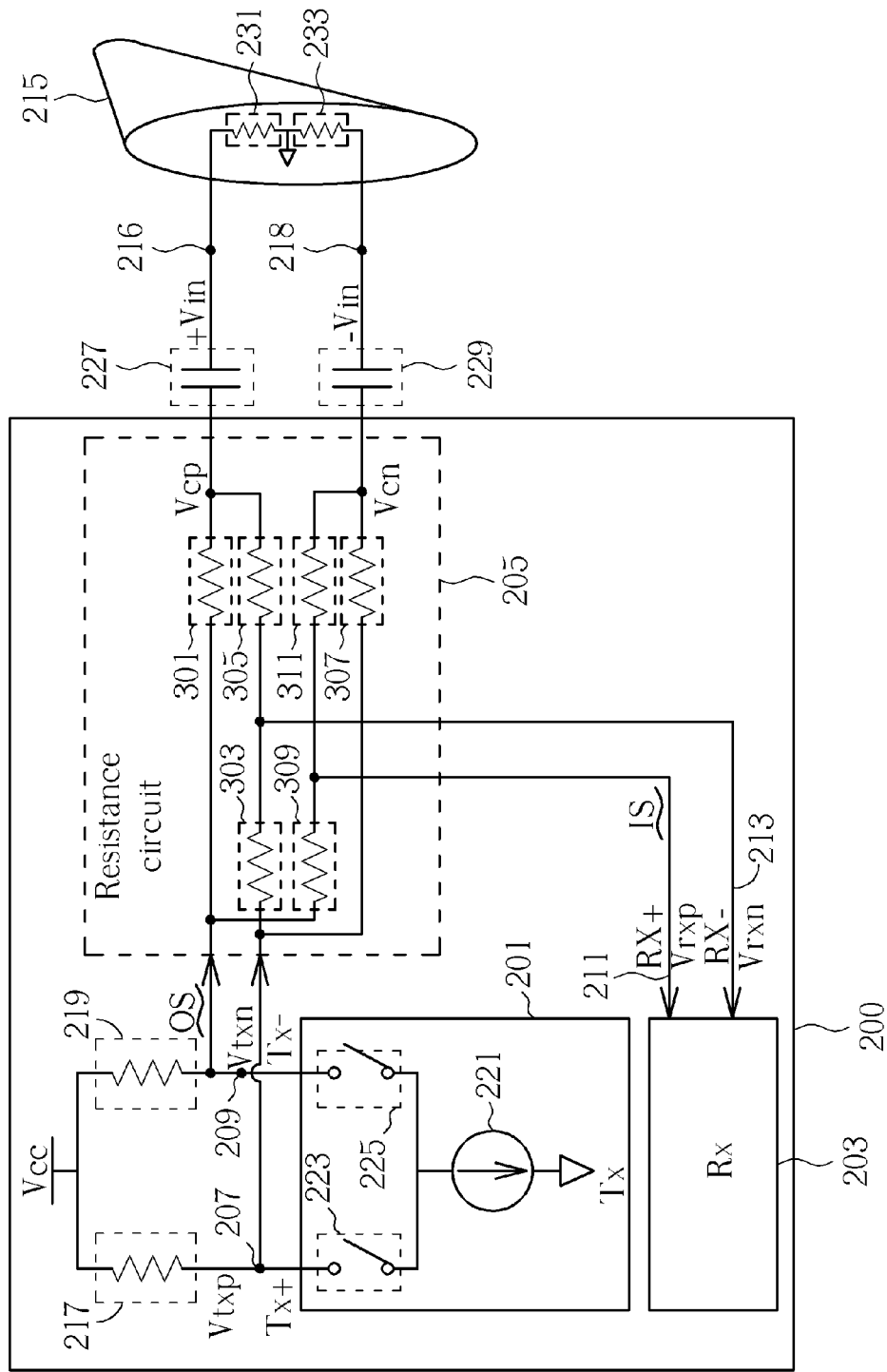
FIG. 3 is a circuit diagram illustrating detail structures of the signal transceiving circuit shown in FIG. 2.

FIG. 3 is a circuit diagram illustrating detail structures of the signal transceiving circuit shown in FIG. 2. In this embodiment, the resistance circuit 205 is consisted of resistors. As shown in FIG. 3, the resistance circuit 205 comprises a first resistor 301, a second resistor 303, a third resistor 305, a fourth resistor 307, a fifth resistor 309 and a sixth resistor 311. A first terminal of the first resistor 301 is coupled to the second transmitting terminal 209, and a second terminal thereof is coupled to the cable 215. A first terminal of the second resistor 303 is coupled to the transmitting terminal 207. A first terminal of the third resistor 305 is coupled to a second terminal of the second resistor 303, and a second terminal thereof is coupled to the cable 215. A first terminal of the fourth resistor 307 is coupled to the transmitting terminal 207, and a second terminal thereof is coupled to the cable 215. A first terminal of the fifth resistor 309 is coupled to the second transmitting terminal 209. A first terminal of the sixth resistor 311 is coupled to a second terminal of the fifth resistor 309, and a second terminal thereof is coupled to the cable 215. The second terminal of the second resistor 303 is further coupled to the second receiving terminal 213, and the second terminal of the fifth resistor 309 is further coupled to the first receiving terminal 213.

In one embodiment, the second resistor 303 has substantially the same resistance value (9K ohm) with the resistance value of the fifth resistor 309, and the third resistor 305 has substantially the same resistance value (5K ohm) with the resistance value of the sixth resistor 311. That is, the ratio between the resistance values of the second resistor 303 and the fifth resistor 309, and the resistance value of the third resistor 305 and sixth resistor 309 is 9:5. Besides, the first resistor 301 has substantially the same resistance value (40 ohm) with the resistance value of the fourth resistor 307. Also, the equivalent resistors 231 and 233 of the cable 215 are both 50 ohm. That is, the ratio between the resistance values of the first resistor 301 and fourth resistor 307, and the resistance value of the equivalent resistors 231 and 233 is 4:5. The equivalent resistor 231 is the cable equivalent resistor of looking from the transmitting paths Tx−(301, 303, 305) into cable. The equivalent resistor 233 is the cable equivalent resistor of looking from the transmitting paths Tx+(307, 309, 311) into cable. It should be noted that, in the embodiment shown in FIG. 3, for the resistance circuit 205, the transmitter 201 can be regarded as a signal output source to output the output signal OS to the resistance circuit 205. Besides, the cable 215 can be regarded as a signal input source, to output the input signal IS to the resistance circuit 205. It should be noted that the ratio between the resistance values of the second resistor 303 and fifth resistor 309, and which of the third resistor 305 and sixth resistor 309, and the ratio between the resistance values of the first resistor 301 and fourth resistor 307 and which of the equivalent resistors 231 and 233 can be other values except above-mentioned 9:5 and 4:5. Also, all resistors can be replaced with other active devices that can form resistance (ex. MOSFET).

The following description describes why the embodiment shown in FIG. 3 can omit the noise that the output signal OS causes to the input signal IS. Please notes the following embodiment only considers AC component but considers no DC component.

Suppose $$Vtxp = Vtx \quad \text{(equation 1)}$$

then $$Vtxn = -Vtx \quad \text{(equation 2)}$$

Vtxp and Vtxn are the voltages at the first transmitting terminal 207 and the second transmitting terminal 209.

Since the resistance values of the second resistor 303, the third resistor 305, the fifth resistor 309 and the sixth resistor 311 (5K ohm and 9K ohm) are much larger than the resistance value of the first resistor 301, the fourth resistor 307 and the cable equivalent resistors 231, 233 (40 ohm and 50 ohm), the currents flowing through the second resistor 303, the third resistor 305, the fifth resistor 309 can be ignored.

$$Vcp = -Vtx*R231/(R231+R301) = -Vtx*50/(40+50) \quad \text{(equation 3)}$$

$$Vcn = Vtx*R233/(R233+R307) = Vtx*50/(40+50) \quad \text{(equation 4)}$$

Vcp and Vcn are respectively the voltages at a second terminal of the first resistor 301 and a second terminal of the fourth resistor 307.

Then, voltages can be computer from relations between each resistor.

$$Vrxp = Vtxn*R_{311}/(R_{311}+R_{309}) + Vcn*R_{309}/(R_{311}+R_{309})$$
$$= Vtxn*5K/(5K+9K) + Vcn*9K/(5K+9K) \quad \text{(equation 5)}$$

$$Vrxn = Vtxp*R_{305}/(R_{305}+R_{303}) + Vcp*R_{303}/(R_{305}+R_{303})$$
$$= Vtxp*5K/(5K+9K) + Vcp*9K/(5K+9K) \quad \text{(equation 6)}$$

Vrxp and Vrxn are respectively the voltages at the first receiving terminal 211 and the second receiving terminal 213.

After that, the equations (1) (3) are substituted to equation (6), and equations (2) (4) are substituted to equation (5).

$$Vrxp = -Vtx*5K/(5K+9K) + Vtx*50/(40+50)*9K/(5K+9K) = 0$$

$$Vrxn = Vtx*5K/(5K+9K) - Vtx*50/(40+50)*9K/(5K+9K) = 0$$

By this way, Vtx can be totally omitted, to acquire the result that Vrxp=Vrxn=0.

According to above mentioned description, the noise that the output signal causes at the receiving terminal can be completely omitted.

In view of above-mentioned equations, the first resistor 301 and the fourth resistor 307 can be regarded as a voltage transferring circuit, since the first resistor 301 and the fourth resistor 307 can transfer voltages (decrease voltages). Such voltage transferring circuit can match the cable equivalent resistors 231, 233 to generate voltages Vcp and Vcn, which are related with the voltage Vtxn at the second transmitting terminal 209 and the voltage Vtxp at the first transmitting terminal 207, at a first terminal of the first resistor 301 and a first resistor at the fourth resistor 307 (equations 3, 4). It should be noted, the voltage transferring circuit discussed here is not limited to a single resistance device, any circuit that can cooperate with the cable equivalent resistors 231, 233 to generate a voltage dividing function, should be included in the range of the present application.

Then, the second resistor 303, the third resistor 305, the fifth resistor 309 and the sixth resistor 311 match with each other to generate divided voltages for the voltages Vtxn and Vcn, and the voltages Vtxp and Vcp (equations 5, 6). Thus the divided voltages of the voltages Vtxn and Vcn can be counteracted with each other, and the divided voltages of the voltages Vtxp and Vcp can be counteracted with each other. Therefore, the second resistor 303, the third resistor 305, the fifth resistor 309 and the sixth resistor 311 can be regarded as a voltage dividing circuit. Alternatively, the second resistor 303, and the third resistor 305 can be regarded as a voltage dividing circuit, and the fifth resistor 309 and the sixth resistor 311 can be regarded as another voltage dividing circuit, to voltage-divide the voltage transferring signal and the output signal, such that the output signal generated at the receiver can be counteracted by a voltage that the voltage transferred signal generates at the receiver.

The following concept discloses the signals received by the receiver.

$$Vcp = Vsig \quad \text{(equation 1)}$$

$$Vcn = -Vsig \quad \text{(equation 2)}$$

Vsig and −Vsig indicate the positive and negative voltages of the input signal In generated at the differential signal transmission line.

Since the resistance values of the second resistor 303, the third resistor 305, the fifth resistor 209 and the sixth resistor 311 (5K ohm and 9K ohm) are much larger than the resistance value of the first resistor 301, the fourth resistor 307 and the cable equivalent resistors 231, 233 (40 ohm and 50 ohm), the currents flowing through the second resistor 303, the third resistor 305, the fifth resistor 309 can be ignored.

$$Vtxp = -Vsig*R_{217}/(R_{307}+R_{217}) = -Vsig*10/(40+10) \quad \text{(equation 3)}$$

$$Vtxn = Vsig*R_{219}/(R_{301}+R_{219}) = Vsig*10/(40+10) \quad \text{(equation 4)}$$

Then, voltages can be computer from relations between each resistor.

$$Vrxp = Vtxn*5K/(5K+9K) + Vcn*9K/(5K+9K) \quad \text{(equation 5)}$$

$$Vrxn = Vtxp*5K/(5K+9K) + Vcp*9K/(5K+9K) \quad \text{(equation 6)}$$

Then the equations (1) (3) are substituted to equation (6), and equations (2) (4) are substituted to equation (5).

$$Vrxp = Vsig*10/(40+10)*5K/(5K+9K) - Vsig*9K/(5K+9K) = -Vsig*4/7$$

$$Vrxn = -Vsig*10/(40+10)*5K/(5K+9K) + Vsig*9K/(5K+9K) = Vsig*4/7$$

Via these equations, it is clear that the amplitude of the signal received by the receiver 203 is a ratio to the input signal In, but is not affected by the output signal of the transmitter 201.

Via above-mentioned embodiments, only a resistance circuit is needed to counteract the noise that a nearby transmitter causes to the receiver, thus no complex circuit and tough circuit control. By this way, circuit area can decrease, and the cost for manufacturing and design can decrease.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A signal transceiving circuit, comprising:
   a receiver, for receiving an input signal;
   a transmitter, for transmitting an output signal; and
   a resistance circuit, for omitting noise that the output signal caused to the input signal, comprising:
      a voltage transferring circuit, for generating a voltage transferring signal according to the output signal; and
      a voltage dividing circuit, for voltage-dividing the voltage transferring signal and the output signal, such that a voltage that the output signal generates at the receiver will be counteracted with a voltage that the voltage transferred signal generates at the receiver;
   wherein the receiver receives the input signal from a cable, and the transmitter transmits the output signal to the cable, where the input signal and the output signal are differential signals, the receiver comprising a first receiving terminal and a second receiving terminal, the transmitter comprising a first transmitting terminal and a second transmitting terminal, where the resistance circuit comprises:
      a first resistance device, having a first terminal coupled to the second transmitting terminal, and a second terminal coupled to the cable;
      a second resistance device, having a first terminal coupled to the first transmitting terminal;
      a third resistance device, having a first terminal coupled to a second terminal of the second resistance device, and a second terminal coupled to the cable;
      a fourth resistance device, having a first terminal coupled to the first transmitting terminal, and a second terminal coupled to the cable;
      a fifth resistance device, having a first terminal coupled to the second transmitting terminal; and
      a sixth resistance device, having a first terminal coupled to a second terminal of the fifth resistance device, and a second terminal coupled to the cable;
   wherein the second terminal of the second resistance is coupled to the second receiving terminal, and the second terminal of the fifth resistance device is coupled to the first receiving terminal;
   wherein the voltage transferring circuit comprises the first resistance device and the fourth resistance device, and the voltage dividing circuit comprises the second resistance device, the third resistance device, the fifth resistance device and the sixth resistance device.

2. The signal transceiving circuit of claim 1, wherein the resistance circuit is consisted of passive devices.

3. The signal transceiving circuit of claim 1, wherein the resistance circuit is consisted of active devices.

4. The signal transceiving circuit of claim 1, wherein the voltage transferring circuit matches with equivalent resistance of the cable to generate the voltage transferring signal.

5. The signal transceiving circuit of claim 1, wherein a resistance value of the third resistance device is substantially equal to a resistance value of the sixth resistance device, a resistance value of the second resistance device is substantially equal to a resistance value of the fifth resistance device, a resistance value of the first resistance device is substantially equal to a resistance value of the fourth resistance device;
   the resistance value of the third resistance device and the resistance value of the second resistor exists a first predetermined ratio;

the resistance value of the first resistance device and the equivalent resistance of the cable exists a second predetermined ratio, where the first predetermined ratio and the second predetermined ratio can make that a voltage that the output signal generates at the receiver can be counteracted by a voltage that the voltage transferred signal generates at the receiver.

6. The signal transceiving circuit of claim 5, wherein the first predetermined ratio is 5:9, and the second predetermined ratio is 4:5.

7. The signal transceiving circuit of claim 5, wherein the first resistance device and the fourth resistance device are substantially 40 ohm, the second resistance device and the fifth resistance device are substantially 9K ohm, and the third resistance device and the sixth resistance device are substantially 5K ohm.

8. The signal transceiving circuit of claim 1, wherein a ratio between:
the resistance value of: the first resistance and the fourth resistance; and
the resistance value of: the second, the third, the fifth, and the sixth resistance devices;
can make that a current of the second, the third, the fifth, and the sixth resistance devices can be ignored.

9. A noise reduction circuit, outputting an output signal from a signal outputting source, and receiving an input signal from a signal input source to a receiver, comprising:
a voltage transferring circuit, for generating a voltage transferring signal according to the output signal; and
a voltage dividing circuit, for voltage dividing the voltage transferring signal and the output signal, such that a voltage that the output signal generates at the receiver will be counteracted with a voltage that the voltage transferred signal generates at the receiver;
a first resistance device, having a first terminal coupled to the signal output source, and a second terminal coupled to the signal input source;
a second resistance device, having a first terminal coupled to the signal output source;
a third resistance device, having a first terminal coupled to a second terminal of the second resistance device, and a second terminal coupled to the signal input source;
a fourth resistance device, having a first terminal coupled to the signal output source, and a second terminal coupled to the signal input source;
a fifth resistance device, having a first terminal coupled to the signal output source; and
a sixth resistance device, having a first terminal coupled to a second terminal of the fifth resistance device, and a second terminal coupled to the signal input source;
wherein the voltage transferring circuit comprises the first resistance device and the fourth resistance device, and the voltage dividing circuit comprises the second resistance device, the third resistance device, the fifth resistance device and the sixth resistance device.

10. The noise reduction circuit of claim 9, wherein the voltage transferring circuit matches with equivalent resistance to generate the voltage transferring signal.

11. The noise reduction circuit of claim 9, wherein a resistance value of the third resistance device is substantially equal to a resistance value of the sixth resistance device, a resistance value of the second resistance device is substantially equal to a resistance value of the fifth resistance device, a resistance value of the first resistance device is substantially equal to a resistance value of the fourth resistance device;
the resistance value of the third resistance device and the resistance value of the second resistor exists a first predetermined ratio;
the resistance value of the first resistance device and the equivalent resistance of the cable exists a second predetermined ratio, where the first predetermined ratio and the second predetermined ratio can make that a voltage that the output signal generates at the receiver can be counteracted by a voltage that the voltage transferred signal generates at the receiver.

12. The noise reduction circuit of claim 11, wherein the first predetermined ratio is 5:9, and the second predetermined ratio is 4:5.

13. The noise reduction circuit of claim 11, wherein the first resistance device and the fourth resistance device are substantially 40 ohm, the second resistance device and the fifth resistance device are substantially 9K ohm, and the third resistance device and the sixth resistance device are substantially 5K ohm.

14. The noise reduction circuit of claim 9, wherein a ratio between the resistance value of the first resistance and the fourth resistance, and the resistance value of the second, the third, the fifth, and the sixth resistance devices, can make that a current of the second, the third, the fifth, and the sixth resistance devices can be ignored.

15. A signal transceiving circuit, coupled to a signal input source comprising a first input terminal and a second input terminal, comprising:
a receiver, for receiving an input signal;
a transmitter, comprising a first transmitting terminal and a second transmitting terminal, and for transmitting a differential output signal via the first transmitting terminal and the second transmitting terminal; and
a resistance circuit, for omitting noise that the output signal caused to the input signal, comprising:
a first resistance device, having one terminal coupled to the second transmitting terminal, and the other terminal coupled to the first input terminal;
a second resistance device, having one terminal coupled to the first transmitting terminal, and the other terminal coupled to the second input terminal;
a first voltage dividing circuit, coupled between the first transmitting terminal and the first receiving terminal; and
a second voltage dividing circuit, coupled between the second transmitting terminal and the second receiving terminal.

16. The signal transceiving circuit of claim 15, wherein the first voltage dividing circuit comprises:
a third resistance device, having a first terminal coupled to the first transmitting terminal; and
a fourth resistance device, having a first terminal coupled to a second terminal of the third resistance device, and a second terminal coupled to the first input terminal.

17. The signal transceiving circuit of claim 16, wherein the second voltage dividing circuit comprises:
a fifth resistance device, having a first terminal coupled to the second transmitting terminal; and
a sixth resistance device, having a first terminal coupled to a second terminal of the fifth resistance device, and a second terminal coupled to the second input terminal.

18. The signal transceiving circuit of claim 17, wherein a resistance value of the fourth resistance device is substantially equal to a resistance value of the sixth resistance device, a resistance value of the third resistance device is substantially equal to a resistance value of the fifth resistance device, a resistance value of the first resistance device is substantially equal to a resistance value of the second resistance device, a resistance value of the first resistance device is substantially equal to a resistance value of the second resistance device;
  the resistance value of the third resistance device and the resistance value of the fourth resistance device exists a first predetermined ratio which;
  the resistance value of the first resistance device and the equivalent resistance of the cable exists a second predetermined ratio,
  where the first predetermined ratio and the second predetermined ratio can make that a voltage that the output signal generates at the receiver can be counteracted by a voltage that the voltage transferred signal generates at the receiver.

* * * * *